J. BUECHE.
TRACTOR ATTACHMENT FOR FARM IMPLEMENTS.
APPLICATION FILED NOV. 17, 1917.
1,271,661.
Patented July 9, 1918.
2 SHEETS—SHEET 2.
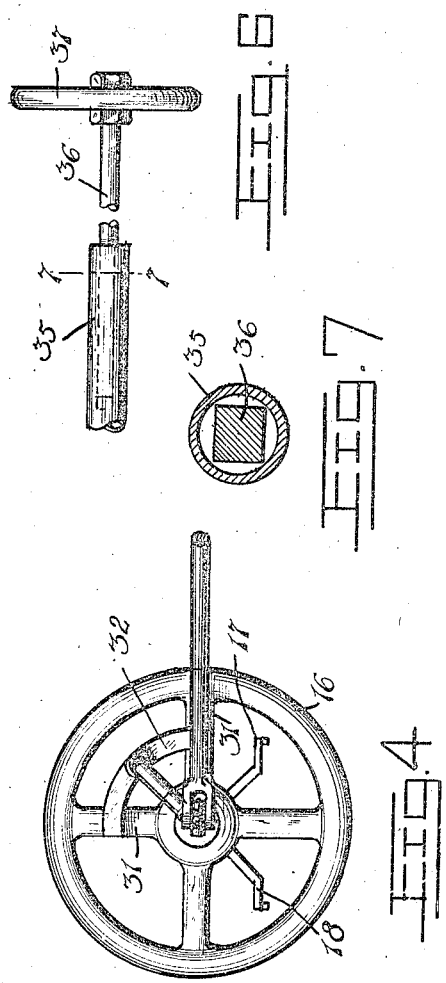
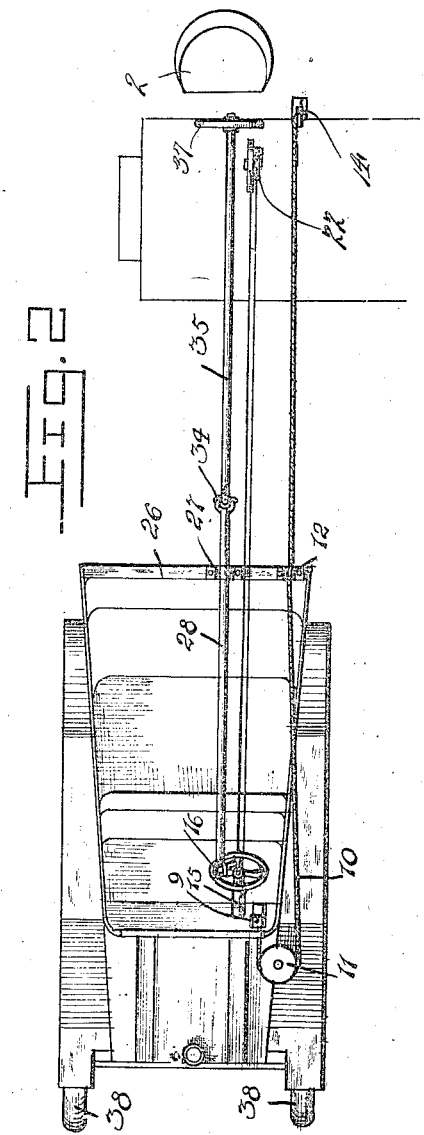
Inventor
Joseph Bueche
By William C. Linton
Attorney

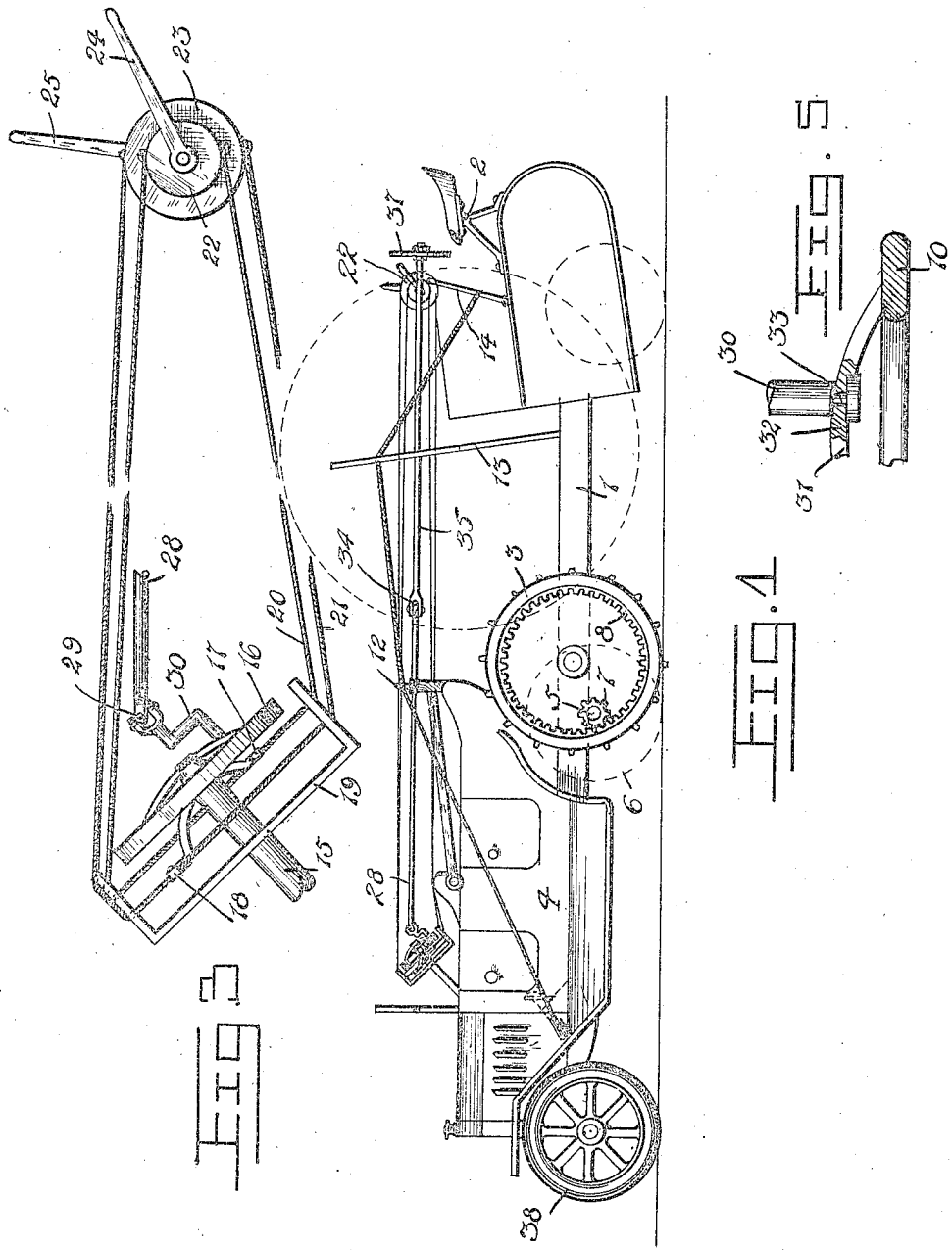

UNITED STATES PATENT OFFICE.

JOSEPH BUECHE, OF GRAY, SASKATCHEWAN, CANADA.

TRACTOR ATTACHMENT FOR FARM IMPLEMENTS.

1,271,661.　　　　Specification of Letters Patent.　　Patented July 9, 1918.

Application filed November 17, 1917. Serial No. 202,443.

*To all whom it may concern:*

Be it known that I, JOSEPH BUECHE, a subject of the King of Great Britain, residing at Gray, Province of Saskatchewan, Canada, have invented certain new and useful Improvements in Tractor Attachments for Farm Implements; and I do hereby declare that the following is a full, clear, and exact description of the invention, such as will enable others skilled in the art to which it appertains to make and use the same.

The present invention relates to tractor attachments for binders and similar farm implements, and an object of the present invention is to connect an ordinary automobile to a binder or other farm implements, whereby the operator mounted upon the binder may have complete control over the automobile as well as operate the binder.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Figure 1 is a side elevation of the device embodying the present invention diagrammatically showing a binder connected to an automobile;

Fig. 2 is a plan view of the same;

Fig. 3 is a detail enlarged side elevation of the controlling mechanisms;

Fig. 4 is a plan view of the steering wheel and its connections;

Fig. 5 is a detail sectional view of the steering wheel;

Fig. 6 is a detail view of the auxiliary steering wheel; and,

Fig. 7 is a cross section taken on the line 7—7 of Fig. 6.

Referring now more particularly to the accompanying drawings wherein like and corresponding parts are designated by similar reference characters throughout the several views.

The farm implement as herein shown is an ordinary binder of any preferred or well known construction, comprising a frame 1 having mounted thereupon the operator seat 2. Journaled upon the shaft carried by the forward end of the frame 1 are the tractor wheels 3. The numeral 4 indicates an ordinary automobile preferably of the Ford type having a rear axle 5 to which are connected the usual driving wheels 6 of the automobile. In connecting the automobile to the binder the wheels 6 are removed and the frame 1 suitably connected to the rear of the automobile frame. When the wheels 6 are removed the pinions 7 are substituted therefor and these pinions 7 are adapted to mesh with the internal gears 8 carried by the tractor wheels 3. From this construction it is obvious that as the automobile is propelled over the ground it will draw the binder with it and by substituting the tractor wheels 3 for the ordinary wheels 6 of the automobile the latter will act as an ordinary traction engine.

As stated in the outset of this specification, it is an object of the present invention to provide means whereby the operator seating upon the seat 2 of the binder may have complete control over the automobile and at the same time be able to operate the binder. To accomplish this object of the invention, steering and controlling mechanisms are connected to the automobile and extend back in reach of the operator seated upon the seat 2 and these steering and controlling mechanisms will be described as follows: The numeral 9 indicates the clutch pedal of the automobile and connected to this clutch pedal is a cable 10. This cable 10 passes over an idler 11 supported upon the frame of the automobile, then up over the automobile past the sheave 12, then through the support 13 and its opposite end is connected to a lever 14 pivotally supported adjacent the operator seat 2.

From this it is obvious that when the operator seated in the seat 2 pulls upon the lever 14, the clutch of the automobile gearing will be released thereby disconnecting the driven shaft from the crank shaft of the engine of the automobile, but when this lever 14 is released the clutch will, in its usual manner, return so as to connect the driving shaft with the crank shaft of the automobile.

The numeral 15 indicates the steering post of the automobile having the usual steering wheel, gasolene controlling lever 17 and the spark controlling lever 18. Also supported upon the steering post 15 is a frame 19, and extending through this frame are the cables 20 and 21. The opposite ends of the cable 20 are connected to the gasolene controlling lever 17 and its medial portion is wound upon the drum 22. The opposite ends of the cable 21 are connected to the spark controlling lever 18 and the medial portion of this cable 21 is wound upon the drum 23. Connected to the respective drums 22 and 23 are the levers 24 and 25 which levers are arranged adjacent the operator seat 2, whereby upon moving the levers 24 and 25 the spark and gasolene controlling levers may be adjusted to the desired position. Supported upon the automobile is a frame 26 upon which is secured a bearing 27 and through this bearing extends a shaft 28. This frame 26 also supports the sheave 12. One end of the shaft 28 is connected by means of a knuckle joint 29 to a crank 30. Secured to the spokes 31 of the steering wheel is a bar 32 and pivotally connected to this bar 32 as at 33 is one end of the crank 30. The opposite end of the rod 28 is connected by means of a knuckle joint 34 to a rod 35 and slidably connected to the rod 35 is a rod 36 carrying an auxiliary steering wheel 37. This rod 36 is provided with a square end which rests within the rod 35, so as to permit longitudinal movement of the rods 35 and 36 with respect to each other, but when the steering wheel 37 is rotated the rod 35 will also be rotated. From this construction it is apparent that when the operator rotates the wheel 37, the steering wheel 16 will also be rotated and the steering wheels 38 of the automobile will be moved for guiding the vehicle over the ground.

By connecting an automobile to an ordinary binder in the manner aforesaid the operator will have complete control over the automobile for causing the same to be propelled over the ground and at the same time he will be able to operate the binder.

Having thus fully described my invention, what I claim as new and desire to secure by Letters Patent is—

1. The combination with a binder and an automobile for propelling the same over the ground, said automobile having a steering wheel, of a crank connected to said steering wheel, a shaft connected to said crank, an auxiliary steering wheel connected to said shaft, said auxiliary steering wheel being arranged upon said binder, and means whereby upon the rotation of said auxiliary steering wheel the automobile and binder will be guided over the ground substantially as and for the purpose specified.

2. The combination with an automobile having a clutch pedal, steering wheel and motor controlling levers; of a machine detachably connected to said automobile, a cable connected to said clutch pedal and extending to said machine, a cable connected to said controlling levers and extending to said machine, a crank connected to said steering wheel, an auxiliary steering wheel mounted upon said machine, and means for slidably and flexibly connecting said auxiliary steering wheel to said crank substantially as and for the purpose specified.

In witness whereof I have hereunto set my hand.

JOSEPH BUECHE.